United States Patent
Hernandez et al.

(10) Patent No.: US 7,506,552 B2
(45) Date of Patent: Mar. 24, 2009

(54) MICRO TORQUE AND MICRO STIFFNESS MEASUREMENT DEVICE

(75) Inventors: Manuel A. Hernandez, San Jose, CA (US); Yen Fu, San Jose, CA (US); Ellis T. Cha, San Ramon, CA (US)

(73) Assignee: SAE Magnetics (H.K.) Ltd., Shatin, N.T. (HK)

( * ) Notice: Subject to any disclaimer, the term of this patent is extended or adjusted under 35 U.S.C. 154(b) by 224 days.

(21) Appl. No.: 11/704,017

(22) Filed: Feb. 7, 2007

(65) Prior Publication Data

US 2008/0186633 A1    Aug. 7, 2008

(51) Int. Cl.
G01L 3/02 (2006.01)
G01L 3/00 (2006.01)
(52) U.S. Cl. .............................. 73/862.191; 73/862.23; 73/862.08
(58) Field of Classification Search .................. 73/1.09, 73/1.15, 862.23, 862.08, 862.191
See application file for complete search history.

(56) References Cited

U.S. PATENT DOCUMENTS

| | | | | |
|---|---|---|---|---|
| 5,212,657 A | * | 5/1993 | Uchikawa et al. | 702/42 |
| 5,297,440 A | * | 3/1994 | Rizk et al. | 73/849 |
| 5,787,570 A | | 8/1998 | Ressmeyer et al. | 29/603.09 |
| 6,059,506 A | | 5/2000 | Kramer | 414/5 |
| 6,979,164 B2 | | 12/2005 | Kramer | 414/5 |
| 2005/0258827 A1 | * | 11/2005 | Patland et al. | 324/210 |

* cited by examiner

*Primary Examiner*—Harshad Patel
*Assistant Examiner*—Jonathan Dunlap
(74) *Attorney, Agent, or Firm*—Kenyon & Kenyon LLP

(57) ABSTRACT

In a method and apparatus for testing a head-gimbal assembly (HGA), a HGA is placed in contact with force transducers mounted on a rotational stage. The force transducers are adjusted to position the transducers around a rotational center of the rotational stage. The rotational stage is rotated, and the torque and variations in torque exerted by the HGA on the force transducers during rotation are measured.

23 Claims, 5 Drawing Sheets

MICRO TORQUE AND MICRO STIFFNESS MEASUREMENT DEVICE

BACKGROUND INFORMATION

The present invention relates to a measurement device for a head gimbal assembly. More specifically, the present invention relates to a method of and an apparatus for measuring torque and stiffness in the range of one micro-Newton meter and below for a head-gimbal assembly.

FIG. 1 illustrates a hard disk drive design typical in the art. Magnetic recording hard disk drives 100 use a read/write transducer or head mounted on an air-bearing slider for reading and/or writing data to a disk. The slider is attached to an actuator arm by a suspension. The combination of the slider and suspension is called a head-gimbal assembly (HGA) 102. The HGA uses the suspension for manipulating the read/write transducers throughout the disk. Typically, suspensions are miniature sheet metal springs that are very flexible. The sheet metal springs are in part rotational springs with stiffness values below one micro-Newton-meter per degree. Measuring these springs has become a challenge when trying to evaluate this parameter exactly as it operates in the disk drive. In addition, measuring torque in the range of one micro-Newton meter and below is difficult. For accurate measurement of this range of torques, the minimum resolution needed is below 0.05 micro-Newton meters. However, the most sensitive torque transducers in the market today cannot measure below 35 micro-Newton meters.

Several problems also exist with the methods used today to measure torque and stiffness of HGA suspensions. Most of the methods used today, including those known as "static" or "dynamic," introduce extra parts such as relatively large bars that must be bonded to sliders. Adding these extra parts tends to introduce inaccuracies in the results due to the geometric variations in manufacturing these extra parts. Another problem with existing methods is that the parts being tested do not experience the exact boundary conditions as they do in their final state in the disk drive. One missing boundary condition is Z-height. Both "static" and "dynamic" measurement methods mount the HGAs on the testers in a state different from their natural state in the disk drive. Similarly, "static" and "dynamic" methods do not exert the correct load onto the air bearing of the slider. As a result, both of these methods produce results that are often questionable as to their accuracy and/or validity.

Thus, what is needed is an improved method and apparatus for measuring the stiffness and torque of a HGA in the range of one micro-Newton meter and below.

DETAILED DESCRIPTION

An apparatus and method for testing a head-gimbal assembly (HGA) are disclosed. A HGA is placed in contact with force transducers mounted on a rotational stage. The force transducers are adjusted to be positioned about a rotational center of the rotational stage. The rotational stage is rotated, and the torque and variations of torque exerted by the HGA on the force transducers during rotation are measured.

Figure 1:
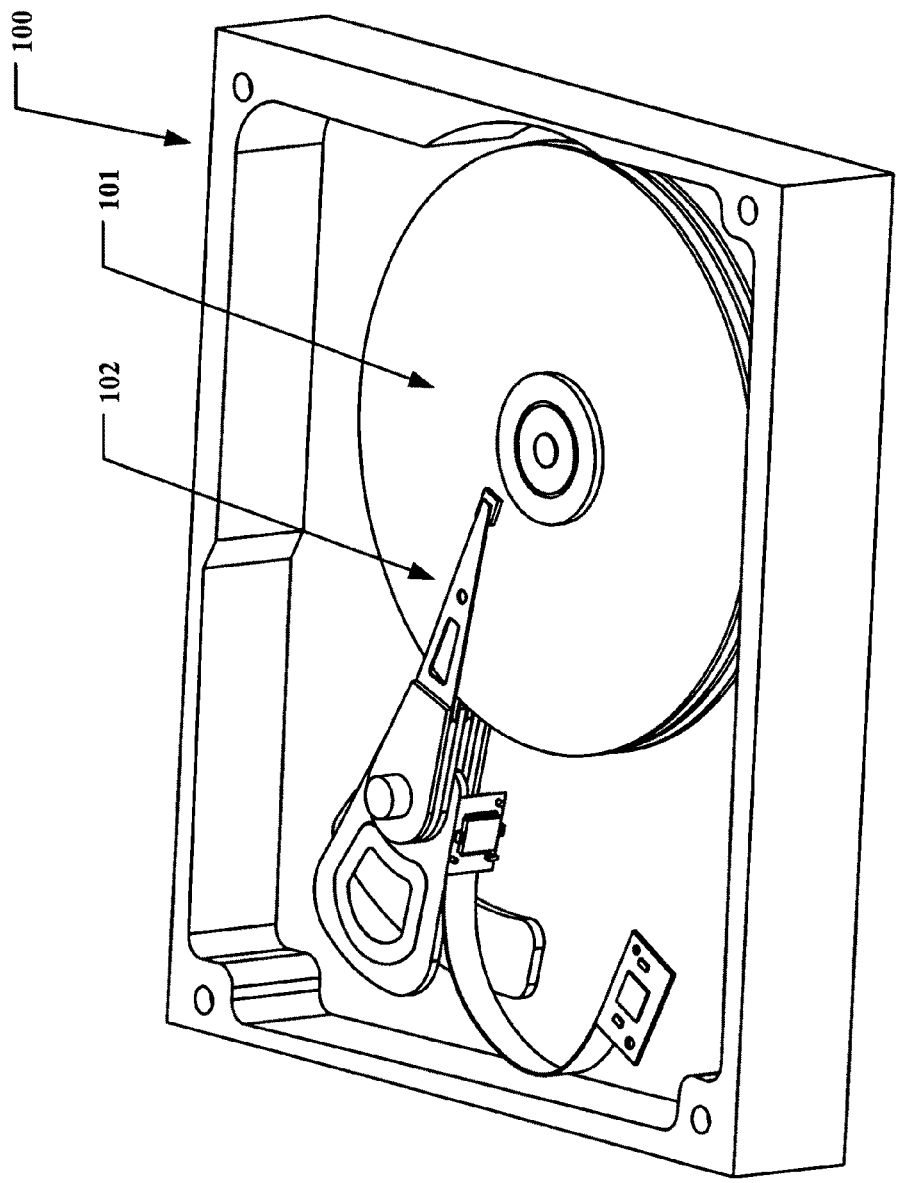
FIG. 1 illustrates a hard disk drive design typical in the art.
Figure 2:
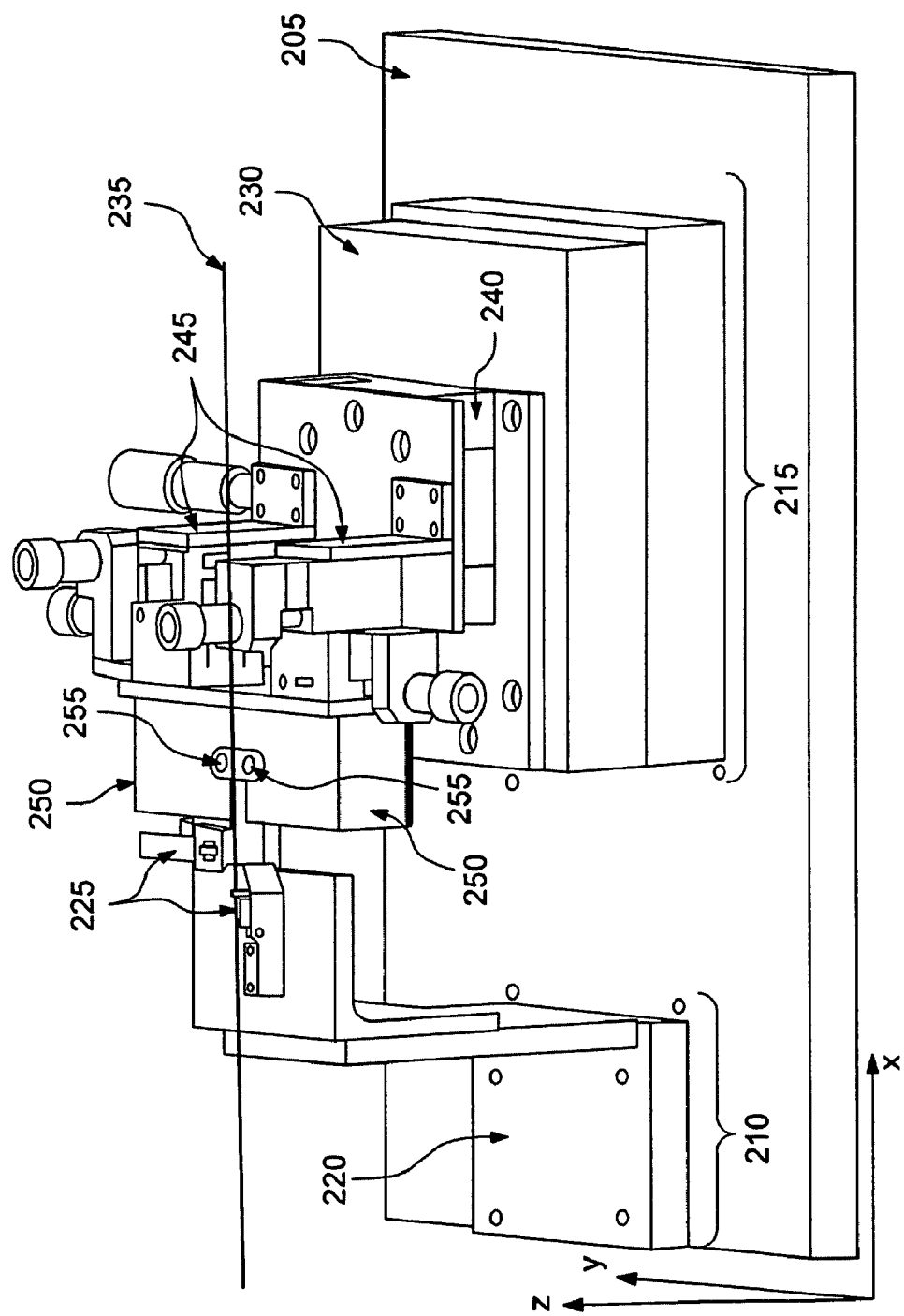
FIG. 2 illustrates one embodiment of a micro-torque and micro-stiffness measurement device.

FIG. 2 illustrates one embodiment of a micro-torque and micro-stiffness measurement device. A base plate 205 houses two independent mechanisms. The first mechanism 210 houses a device under test, such as an HGA, and may remain completely stationary during the test. A tri-axial stage 220 may be mounted to the stationary base of the first mechanism 210. One or more assemblies 225 housing the HGA being tested may be mounted to the tri-axial stage 220. The tri-axial stage 220 may enable the HGA being tested to be adjusted in the x-, y-, and z-axes.

The second mechanism 215 may include a rotational stage 230 mounted on the base plate 205. In one embodiment, the rotational stage 230 may be a high-precision goniometer. The rotational stage 230 may have a rotational center 235 parallel to the x-axis. During testing, the rotational stage 230 and everything mounted on it may rotate about its rotational center 235. The rotation of the rotational stage or high-precision goniometer may permit the angular deformation of the gimbal structure of an HGA to be controlled. A linear stage 240 may be mounted on the rotational stage 230. The linear stage 240 may move perpendicular to the rotational stage's center of rotation. Additional components may be mounted on the top surface of the linear stage 240. The linear stage 240 may be adjusted to ensure that any components mounted on its top surface are aligned and rotating symmetrically about the rotational center 235 of the rotational stage 230. Bilinear stages 245 may be mounted on top of the linear stage 240. In one embodiment, two bilinear stages 245 may move in the y- and z-axes. One or more force transducer assemblies 250 may be mounted above the bilinear stages 245. The force transducer assemblies 250 may be positioned and adjusted in the y- and z-axes by the bilinear stages 245. The force transducer assemblies 250 may house force transducers or load cells 255 which detect any loads and changes in loads applied to them in the z-axis direction.

Figure 3:
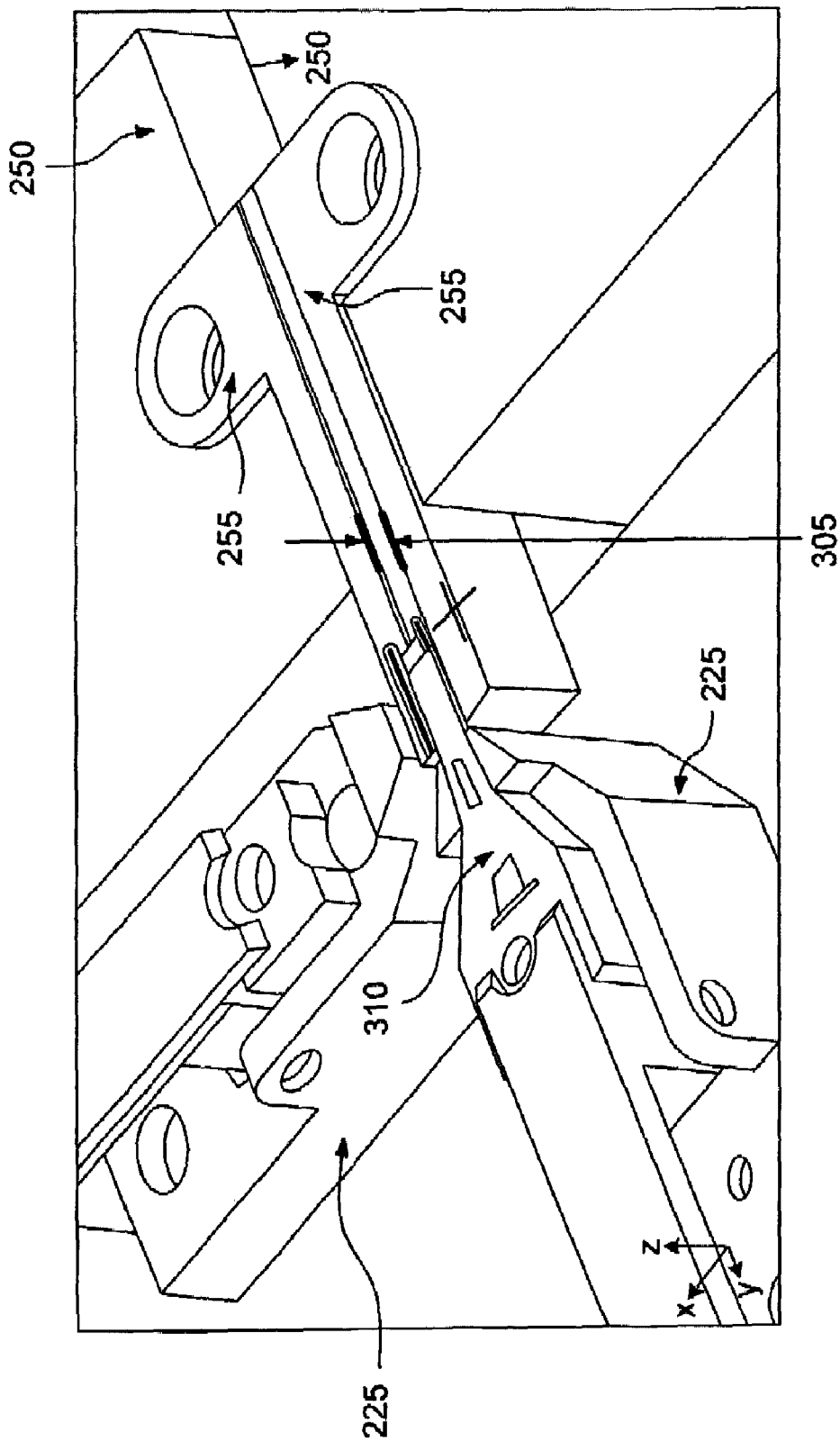
FIG. 3 illustrates one embodiment of a micro-torque and micro-stiffness measurement device.

FIG. 3 illustrates one embodiment of a micro-torque and micro-stiffness measurement device. The force transducer assemblies 250 described in the second mechanism 215 may house force transducers or load cells 255. In one embodiment, two force transducers 255 may be housed in the force transducer assemblies 250. The two force transducers 255 may be housed parallel to each other and the x-axis with a variable spacing 305 between the two transducers. The first mechanism 210, as described above, may include a tri-axial stage 220 and an HGA housing assembly 225 mounted on the tri-axial stage. In one embodiment, the HGA housing assembly 225 may include two components positioned orthogonally to each other. An HGA or other device under test 310 may be housed in or mounted to the HGA housing assembly with one end of the HGA or device under test resting and coming into a line contact with the each of the two force transducers 255.

FIG. 3 further illustrates one embodiment in which the device under test or HGA 310 is mounted in a position parallel to the contact lines of the force transducers. In this position, rotation of the high-precision goniometer may control angular deformation of the HGA in the roll direction. The corresponding torque or force measured by the force transducers or load cells 255 during rotation of the high-precision goniometer or rotational stage is known as "roll" torque. In another embodiment, the HGA or device under test 310 may be dismounted from the HGA housing assembly component 225 which is parallel to the contact lines of the force transducer. The HGA or device under test 310 instead may be mounted to the HGA housing assembly component 225 which is orthogonal to the contact lines of the force transducers. In this position, rotation of the high-precision goniometer may control angular deformation of the HGA in the pitch direction. The torque or force measured from this orthogonal position during testing is known as "pitch" torque. The contact lines of the two transducers 255 may be parallel to each other and orthogonal to the direction of the torque of interest. The spacing 305 between the two contact lines of the transducers dictates the magnitude of force applied by the HGA or device under test 310 onto the transducers 255. During testing, the rotational stage 230 may rotate the device under test or HGA 310, with the device under test or HGA 310 in turn exerting force on the force transducers 255. The force exerted on the transducers due to any rotational changes may be inversely proportional to the distance between the transducer contact lines. Accordingly, the distance 305 between the contact lines affects the sensitivity of the test measurement. The variable spacing 305 between the contact lines of the transducers may approach zero but without the transducers contacting each other to increase sensitivity of the measurement.

Figure 4:
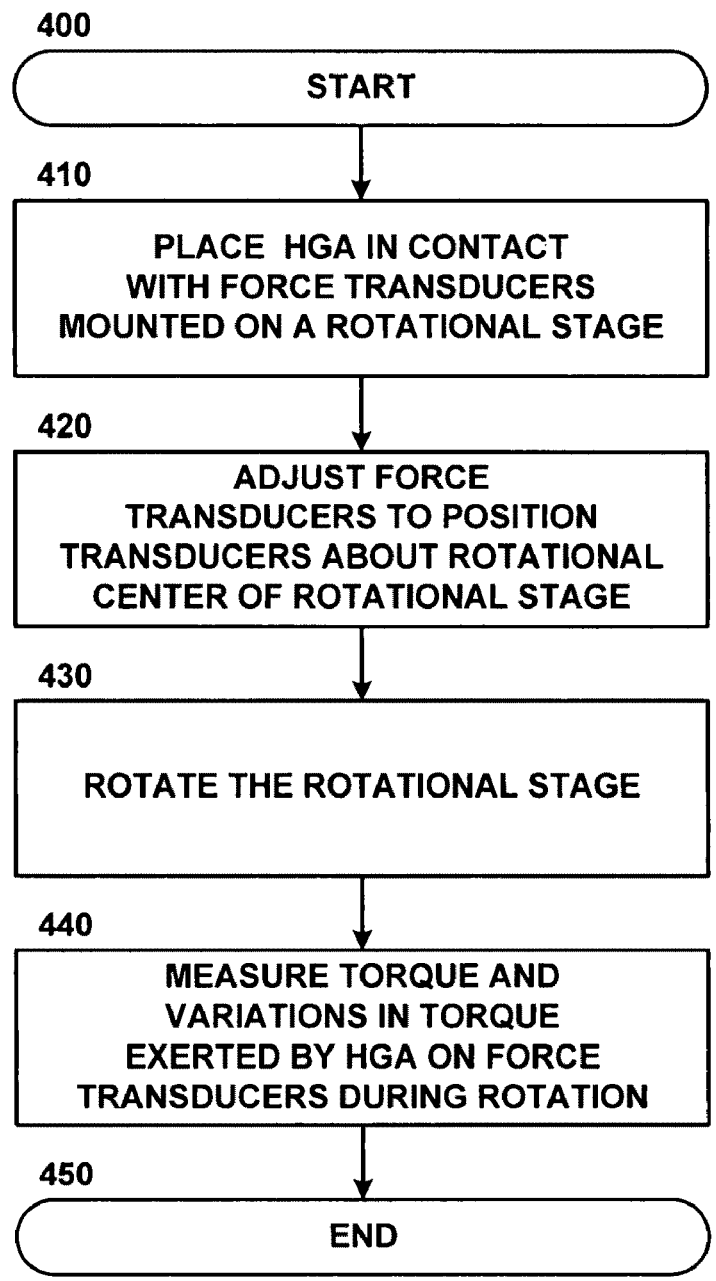
FIG. 4 illustrates in a flowchart one embodiment for testing the torque and stiffness of an HGA.

FIG. 4 illustrates in a flowchart one embodiment for testing the torque and stiffness of an HGA. In block 410, a head-gimbal assembly (HGA) 310 is placed in contact with force transducers 255 mounted on a rotational stage 230. In one embodiment, two force transducers 255 are mounted on a rotational stage 230. The two force transducers 255 are mounted parallel to each other and the x-axis with a variable spacing 305 between them. The HGA 310 placed in contact with the force transducers 255 may also be parallel to the x-axis and the force transducers. In one embodiment, the HGA 310 may be placed orthogonally to the x-axis and the force transducers 255. In block 420, the position of the force transducers 255 may be adjusted such that the force transducers 255 are positioned about the rotational center 235 of the rotational stage 230. This adjustment may re-position the force transducers 255 in the y- and z-axis directions. In an embodiment, the position of the HGA 310 may also be adjusted in the x-, y-, and z-axis directions to center the HGA 310 within the variable spacing 305 between the force transducers 255.

In block 430, the rotational stage 230, such as a high-precision goniometer, and everything mounted on or in contact with the rotational stage is rotated. The rotation causes force to be exerted on the HGA 310 in contact with the force transducers 255. In block 440, the torque and variations in torque exerted by the HGA 310 on the force transducers 255 during rotation of the goniometer 230 are measured. The width of the variable spacing 305 between the force transducers 255 may affect the sensitivity of the torque measurement. In one embodiment, the width of the variable spacing 305 may be decreased such that the width of the spacing approaches zero but contact between the two transducers 255 is avoided. A decreasing width in the spacing 305 between the transducers 255 may increase the sensitivity of the torque measurement. In another embodiment, the testing of the torque and stiffness of an HGA 310 may be conducted in an environmental chamber. The environmental chamber may enable pressure, temperature, and humidity conditions to be controlled during the test. The testing ends in block 450.

Figure 5:
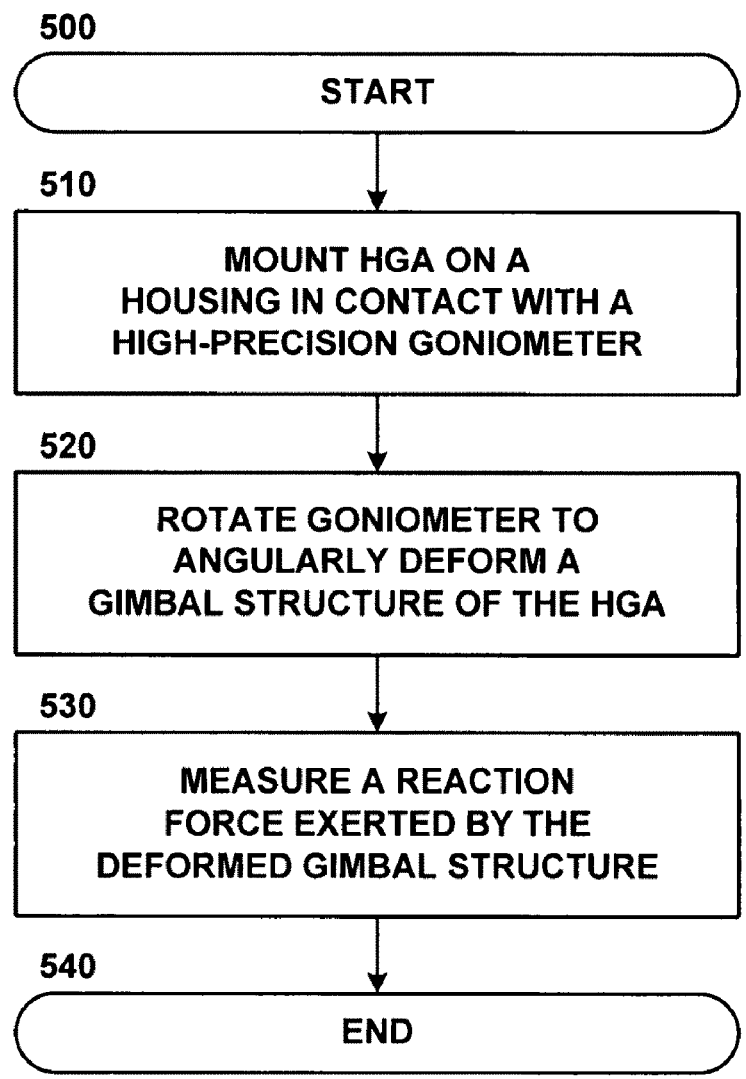
FIG. 5 illustrates in a flowchart one embodiment for testing the torque and stiffness of an HGA.

FIG. 5 illustrates in a flowchart one embodiment for testing the torque and stiffness of an HGA. In block 510, an HGA 310 may be mounted on a housing 225 such that the HGA 310 is in contact with a high-precision goniometer 230. In block 520, the goniometer 230 may be rotated resulting in angular deformation of a gimbal structure of the HGA. In one embodiment, the HGA 310 may be mounted in such a position that rotation of the goniometer 230 results in angular deformation of the gimbal structure in a pitch direction. In another embodiment, the HGA 310 may be mounted in such a position that rotation of the goniometer 230 results in angular deformation of the gimbal structure in a roll direction. The HGA 310 also may be mounted and tested in a configuration where an air-bearing surface of a slider in the HGA is at any angular orientation and vertical distance from the mounting surface of the HGA housing. Alternatively, the HGA 310 may be mounted and tested in a configuration similar to that found in a disk drive. In this configuration, the vertical distance between an air-bearing surface of a slider in the HGA and the mounting surface of the HGA assembly may equal or approximate the 'Z'-height. In block 530, a reaction force exerted by the deformed gimbal structure of the HGA may be measured. The reaction force exerted by the deformed gimbal structure may be measured at a preset moment arm. In one embodiment, the testing of the HGA may occur in an environmental chamber to enable pressure, temperature, and humidity conditions during the test to be controlled. The testing ends in block 540.

Therefore, the foregoing is illustrative only of the principles of the invention. Further, those skilled in the art will recognize that numerous modifications and changes are possible, the disclosure of the just-described embodiments does not limit the invention to the exact construction and operation shown, and accordingly, all suitable modifications and equivalents fall within the scope of the invention.

What is claimed is:

1. A method for testing a head-gimbal assembly, comprising:
    placing said head-gimbal assembly in contact with force transducers mounted on a rotational stage;
    adjusting said force transducers to position said force transducers about a rotational center of said rotational stage;
    rotating said rotational stage; and
    measuring the torque and variations in torque exerted by said head-gimbal assembly on said force transducers during said rotation.

2. The method of claim 1, wherein said force transducers include two force transducers parallel to each other and the x-axis with a variable spacing between said force transducers.

3. The method of claim 2, wherein said head-gimbal assembly is placed in parallel to the x-axis and said force transducers.

4. The method of claim 3, wherein said measured torque is a head-gimbal assembly roll torque.

5. The method of claim 2, wherein said head-gimbal assembly is placed orthogonally to the x-axis and said force transducers.

6. The method of claim 5, wherein said measured torque is a head-gimbal assembly pitch torque.

7. The method of claim 2, further comprising adjusting said head-gimbal assembly in the x-, y-, or z-axis directions to center said head-gimbal assembly within said variable spacing.

8. The method of claim 2, wherein the width of said variable spacing is narrowed to increase the sensitivity of said torque measurement.

9. The method of claim 1, wherein said force transducers are adjusted in the y- and z-axis directions.

10. The method of claim 1, wherein said torque measurement is calculated by said two force transducers.

11. The method of claim 1, wherein said testing is conducted in an environmental chamber with pressure, temperature, and humidity controls.

12. An apparatus for testing a head-gimbal assembly, comprising:
 a goniometer to control an angular deformation of the gimbal structure of said head-gimbal assembly; and
 a set of load cells mounted on a rotational stage of said goniometer to measure the reaction forces from the deformed gimbal structure.

13. The apparatus of claim 12, further comprising:
 a base plate on which said goniometer and a stationary housing are mounted;
 a tri-axial stage mounted on said stationary housing, said tri-axial stage capable of movement in the x-, y-, and z-axes and including an assembly on which to mount said head-gimbal assembly;
 a linear stage, mounted to said goniometer, to align a load cell assembly housing said set of load cells about a center of rotation of said goniometer; and
 at least one bilinear stage, mounted to said linear stage, to position and adjust said load cell assembly in the y- and z-axes.

14. The apparatus of claim 13, wherein said head-gimbal assembly is mounted and tested in a configuration such that an air-bearing surface of a slider of said head-gimbal assembly is at any angular orientation and vertical distance from a mounting surface of said set of load cells.

15. The apparatus of claim 13, wherein said head-gimbal assembly is mounted and tested in a configuration similar to one in a disk drive, said configuration including a vertical distance between an air-bearing surface of a slider of said head-gimbal assembly and a mounting surface of said set of load cells equal to a 'Z'-height.

16. The apparatus of claim 12, wherein said goniometer is used to control the angular deformation in a pitch direction and said load cells are used to measure the reaction forces exerted by the gimbal at a preset moment arm.

17. The apparatus of claim 12, wherein said goniometer is used to control the angular deformation in a roll direction and said load cells are used to measure the reaction forces exerted by the gimbal at a preset moment arm.

18. A method for testing a head-gimbal assembly, comprising:
 mounting said head-gimbal assembly on a housing, said head-gimbal assembly in contact with a goniometer;
 rotating said goniometer to angularly deform a gimbal structure of said head-gimbal assembly; and
 measuring a reaction force exerted by the deformed gimbal structure.

19. The method of claim 18, wherein said goniometer is rotated to angularly deform said gimbal structure in a pitch direction and said reaction forces exerted by said gimbal structure are measured at a preset moment arm.

20. The method of claim 18, wherein said goniometer is rotated to angularly deform said gimbal structure in a roll direction and said reaction forces exerted by said gimbal structure are measured at a preset moment arm.

21. The method of claim 18, wherein said head-gimbal assembly is mounted and tested in a configuration wherein an air-bearing surface of a slider of said head-gimbal assembly is at any angular orientation and vertical distance from said mounting surface of said housing.

22. The method of claim 18, wherein said head-gimbal assembly is mounted and tested in a configuration similar to a disk drive, wherein a vertical distance between an air-bearing surface of a slider of said head-gimbal assembly and said mounting surface of said housing is equal to a 'Z'-height.

23. The method of claim 18, wherein said testing occurs in an environmental chamber with pressure, temperature, and humidity controls.

* * * * *